United States Patent [19]

Moss

[11] 4,274,734
[45] Jun. 23, 1981

[54] MASKING FRAME

[75] Inventor: Brian F. Moss, Rayleigh, United Kingdom

[73] Assignee: Ciba-Geigy AG, Basel, Switzerland

[21] Appl. No.: 94,247

[22] Filed: Nov. 14, 1979

[30] Foreign Application Priority Data

Nov. 20, 1978 [GB] United Kingdom ............. 45288/78

[51] Int. Cl.³ .......................................... G03B 27/58
[52] U.S. Cl. ...................................... 355/74; 355/126
[58] Field of Search .................... 355/54, 72–74, 355/126

[56] References Cited

U.S. PATENT DOCUMENTS

| 2,210,279 | 3/1938 | Sloan | 355/74 |
| 2,246,920 | 6/1941 | Kromholz | 355/74 |
| 2,348,999 | 5/1944 | Peterson | 355/54 |
| 2,453,431 | 11/1948 | Grover | 355/54 |
| 2,496,701 | 2/1950 | De Groff | 355/72 |
| 2,589,094 | 3/1952 | Konopka | 355/74 |
| 2,770,165 | 11/1956 | Vriezelaar | 355/74 X |
| 3,203,334 | 8/1965 | Wilson et al. | 355/126 |
| 3,677,638 | 7/1972 | Daugherty | 355/74 |
| 4,160,597 | 7/1979 | Damm et al. | 355/74 |

FOREIGN PATENT DOCUMENTS

| 1677413 | 3/1954 | Fed. Rep. of Germany. |
| 7615702 | 5/1976 | Fed. Rep. of Germany. |
| 2808132 | 8/1979 | Fed. Rep. of Germany. |
| 985768 | 3/1951 | France ........................... 355/74 |
| 626386 | 7/1949 | United Kingdom. |

Primary Examiner—Richard A. Wintercorn
Attorney, Agent, or Firm—Harry Falber

[57] ABSTRACT

A photographic masking frame is described in which there is a base plate and a raisable frame which holds the print material flat on the base when in the working position and which has an opening in it which is closable by a removable square mask formed in two portions. One of these portions is L-shaped and covers substantially three quarters of the area of the opening and the other of these portions is square and covers the remaining quarter of the opening. The removable mask as a whole can be lifted as a single unit and fits into a square recess of approximately the same dimensions which is made in the top surface of the raisable frame. The area of the recess is greater than the area of the aperture in the frame. The square portion of the mask is raisable without disturbing the L-shaped portion of the mask and overlaps the adjacent edges of the L-shaped portion of the mask and so renders the join light-tight.

6 Claims, 6 Drawing Figures

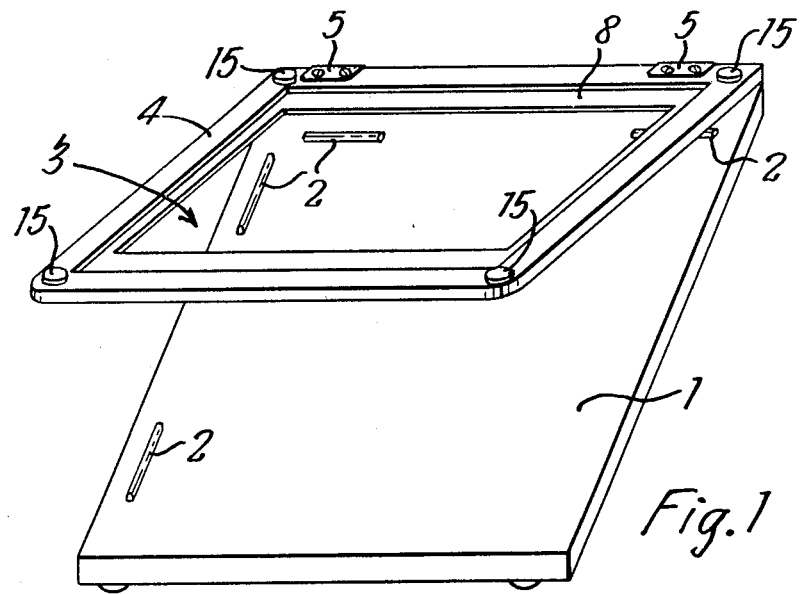
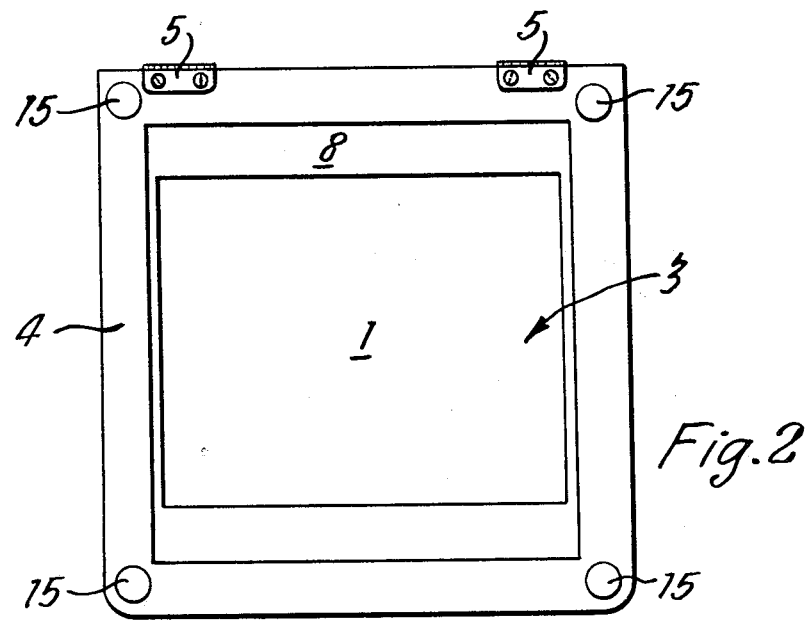

MASKING FRAME

This invention relates to a photographic masking frame.

Photographic masking frames are used when it is desired to print a plurality of test prints or repeat prints on one large sheet of sensitised print material. It is a particular requirement of such a masking frame that it be completely light tight to allow recomposing of pictures on the topside of the frame whilst print material is present in the frame.

Various prior art masking frames are known and have been described in the patent literature, for example the following patent specifications all describe masking frames: British patent specifications Ser. Nos. 1372857 and 1460193 and U.S. Pat. Nos. 2496701; 2348999 and 2455431.

In these specifications reference is made to the difficulties of securing light-tightness is a number of small masks are used to cover the exposure aperture. Also in these specifications the individual mask or masks actually fit into the exposing aperture and often appear to be in physical contact with the paper being exposed. In some cases in order to alter the exposure position the masks are actually moved over the paper which could lead to scratch marks on the paper. Further, in some cases more than two small masks are required to totally cover the expsoure area and this could lead to exposure errors, some areas being twice exposed and some areas not exposed at all. We have overcome all these shortcomings of the prior art masking frame by providing a masking frame which is square in shape and which can be lifted up in one piece and repositioned very easily. Further the mask is not in contact with the paper being exposed. Also the masking frame we have devised has the great advantage that even though it is square the exposure aperture can nevertheless be oblong in shape as most prints are required to be oblong and not square.

According to the present invention there is provided a photographic masking frame which comprises a base plate and a raisable frame which holds the print material flat on the base when in the working position and which has an aperture therein, the aperture in the said raisable frame being closed by a removable square mask formed in two portions, one portion being L shaped and covering substantially three quarters of the area of the aperture and the other portion being square and covering the remaining quarter area of the aperture, the said removable mask which can be lifted as a single unit fitting into a square recess of like dimensions formed in the top surface of the raisable frame, the area of the recess being greater than the area of the aperture in the frame, the said square portion of the mask being raisable without disturbing the L shaped portion of the mask and overlapping the adjacent edges of the L shaped portion of the mask so as to render the join light tight.

Preferably the raisable frame is hingedly connected to the base plate so holding the frame in register with the base plate.

Therefore the important feature of this masking frame is that the square mask rests in a recess in the top surface of the raisable frame. Thus no light is able to get through the removable square mask when it is in position in the recess in the frame because it rests on a portion of the frame all the way round and no light can get through the join between the L shaped portion of the mask and the square quarter portion because the square quarter portion overlaps the L shaped portion at the join.

Preferably the removable square mask has a white surface to enable a picture to be composed thereon. Preferably the base plate is also white but most preferably it has a matt white surface to prevent back reflection therefrom during exposure of the print material.

As it is unusual to produce square prints preferably the aperture in the frame is rectangularly oblong shaped and not square. A particularly useful size for the aperture is 7¾ inches (19.7 cm) high by 9¾ inches (24.8 cm) broad. In such case the masking frame can be used to produce either one 7¾×9¾ inch print on one sheet of 8×10 inch paper or four 3.8×4.8 inch prints.

Most preferably the size of the aperture and the size of the L shaped portion of the mask are so chosen that exposure of an 8×10 inch sheet of print material would yield four prints with an ⅛ inch (3 mm) border around each print. These may be separated by cutting the sheet in half, and then each half in half again.

The accompanying drawings will serve to illustrate the invention.

FIG. 1 is a perspective view of a masking frame showing the base plate and the raisable frame partially raised.

FIG. 2 is a top plan view of the masking frame of FIG. 1 showing the raisable frame in the lowered position.

In all the figures the same numbers have the same signification.

Figure 3:
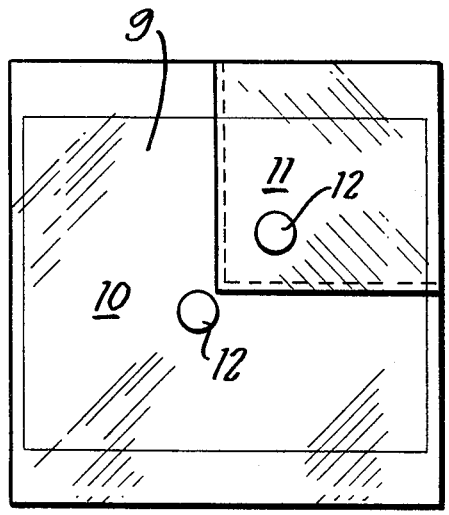
FIG. 3 is a top plan view of a removable square mask showing the L shaped portion and the square quarter portion.

In FIG. 1 a square base plate 1 has mounted thereon four abutment members 2 against which a sheet of print material is pushed to locate it squarely under the exposure aperture 3 which is present in the raisable frame 4 which is hinged to the base plate 1 by hinges 5. (Present in the underside of the frame 4 are recesses to accommodate the abutment members 2 but these are not shown). Surrounding the exposure aperture 3 is a recess 8. Present on the top of the frame are rubber feet 15 (the use of which is described later).

In FIG. 2 the topside of the frame 4 is shown. In this frame is the exposure aperture 3 with the base plate 1 visible therethrough. Surrounding the exposure aperture 3 is a recess 8.

In FIG. 3 there is shown a mask 9 which comprises an L shaped portion 10 and a square quarter portion 11. Also present on the masks 10 and 11 are lifting knobs 12.

Figure 4:
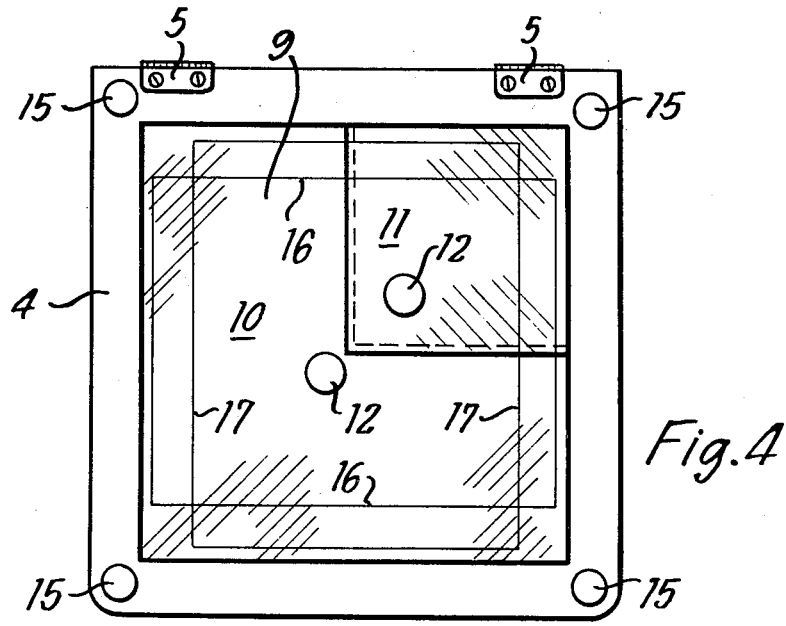
FIG. 4 is a top plan view of the removable square mask in position in the recess in the raisable frame.

In FIG. 4 the mask 9 is in position as a complete unit in the recess 8 in the frame 4. The square quarter of the mask 11 is raised above the plane of the L shaped portion 10 and overlaps the adjacent edges thereof.

Figure 5:
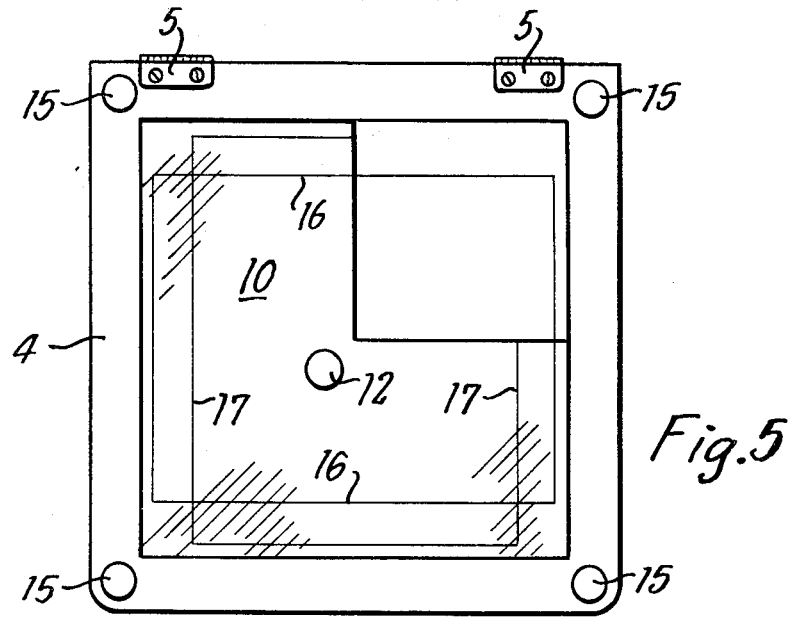
FIG. 5 is a top plan view of the L shaped portion of the removable square mask in position in the raisable frame.

In FIG. 5 the L shaped portion 19 of the mask 9 only is in position, the square quarter portion 11 having been lifted out.

Present on the mask 9 are lines which indicate the position of the print material beneath the mask. Line 16 indicates the position of the print material when the mask is in the position shown in FIG. 4. If the mask were moved a quarter of a revolution then the position of the print material would be indicated by the line 17. Similarly the lines on the quarter portion 11 complete the lines 16 and 17 and also indicate the position of the print material beneath this portion of the mask.

On the underside of the back plate is another white base which can be used for picture composing and accurate focussing. Rubber feet 15 are fitted to the top frame 4 to facilitate this.

In an embodiment shown in the drawings the exposure aperture is 7¾ inches by 9¾ inches (19.7 cm×24.8 cm).

In operation the mask 9 is removed, the photograph is composed in the normal manner. If the prints are to be smaller than 10 inches ×8 inches format, the frame 4 is turned over and the composition and focussing carried out on the base 1 which is also marked for the 4 inch ×5 inch format prints.

Next, the hinged frame 4 is lifted, and if the mask is fitted it will also raise this at the same time. A sheet of photographic paper is inserted and located against the abutment members 2. The frame is lowered. The cover is marked to show the format areas so the enlarger can be switched on and the frame accurately located.

If the print is to be of a whole 10 inch ×8 inch format, the complete mask is removed and the exposure made in the normal way. If four 4 inch ×5 inch format prints are being made, just the quarter portion 11 is removed and a single exposure made. The L shaped portion 10 is then rotated 90° and the quarter cover replaced. The frame can now be relocated on the base to compose the picture in the second area, the quarter portion removed and the second exposure made. Third and fourth exposures are made in a similar manner.

After four such exposures the print material is removed and processed to yield on the one sheet of 8 inch ×10 inch paper four 3.8 inch ×4.8 inch prints with an ⅛ inch border around each print. No dark lines are present in these borders because the masking frame is quite light tight.

If, for any reason, the negative has to be refocussed or the degree of enlargement changed, the mask is removed, the paper remaining in position, and the frame turned upside down so the photograph can be recomposed and focussed on the base.

The unit is so designed that the focussing plane is correct on both sides of the base plate.

Figure 6:
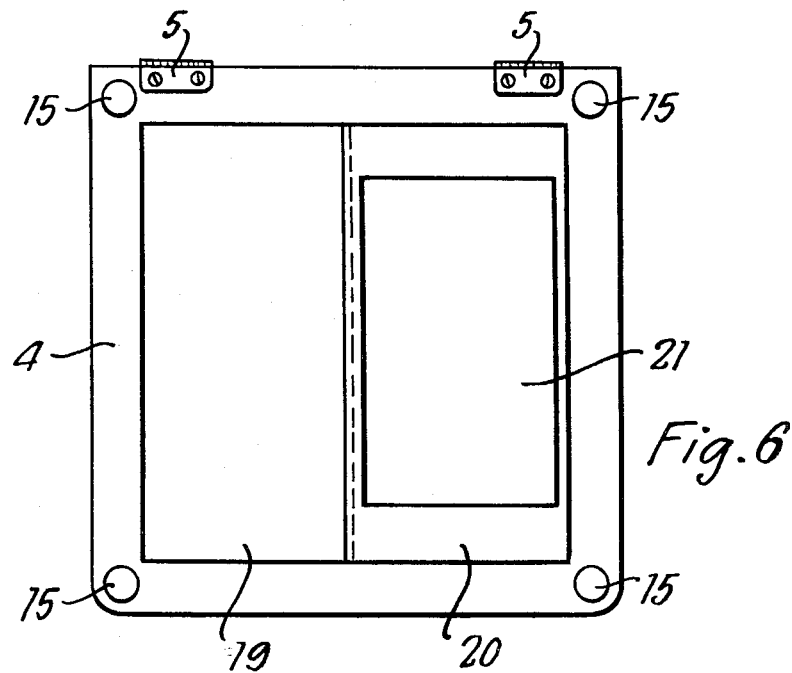
FIG. 6 is a top plan view showing an additional refinement.

FIG. 6 illustrates an additional feature which increases the versatility of the masking frame. This is accomplished by two extra plastic masks 19 and 20 which fit into the recess occupied by the large square mask. The purpose of these is to enable two 5 inch ×8 inch format prints to be made on one 8 inch ×10 inch sheet of paper by exposing one side of the paper whilst mask 19 is in the first position and then the other side when the mask has been slid across the frame. The second mask 20 is provided for framing purposes and renders the masking frame light tight so that a sheet of paper could be left in the frame with the enlarger or the room lights on and both masks in position. The framing mask 20 has a raised portion alone one long edge so that it overlaps the other mask for light trapping purposes when both are in position. This means that the framing mask must be rotated through 180° when it is replaced after sliding the other mask across the frame. Locating spots are provided on the mask and on the frame to facilitate this operation. The framing mask is provided with a white reflecting rectangle 21 which indicates the extent of the exposure area thereunder.

I claim:

1. A photgraphic masking frame which comprises a base plate and a raisable frame which holds the print material flat on the base when in the working position and which has an aperture therein, the aperture in the said raisable frame being closed by a removable square mask formed in two portions, one portion being L shaped and covering substantially three quarters of the area of the aperture and the other portion being square and covering the remaining quarter area of the aperture, the said removable mask which can be lifted as a single unit fitting into a square recess of like dimensions formed in the top surface of the raisable frame, the area of the recess being greater than the area of the aperture in the frame, the said square portion of the mask being raisable without disturbing the L shaped portion of the mask and overlapping the adjacent edges of the L shaped portion of the mask so as to render the join light tight.

2. A photographic masking frame according to claim 1 wherein the raisable frame is hingedly connected to the base plate so holding the frame in register with the base plate.

3. A photographic masking frame according to claim 1 or claim 2 wherein the removable square mask has a white surface.

4. A photographic masking frame according to any one of claims 1 to 3 wherein the base plate has a matt white surface.

5. A photographic masking frame according to any one of claims 1 to 4 wherein the aperture in the frame is rectangularly oblong shaped.

6. A photographic masking frame according to claim 5 wherein the oblong aperture is 19.7 cm high by 24.8 cm broad.

* * * * *